US011575629B2

(12) United States Patent
Gaillet

(10) Patent No.: US 11,575,629 B2
(45) Date of Patent: Feb. 7, 2023

(54) SMART MESSAGE RENDERER

(71) Applicant: Orange, Issy-les-Moulineaux (FR)

(72) Inventor: Thierry Gaillet, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/317,687

(22) Filed: May 11, 2021

(65) Prior Publication Data

US 2021/0359964 A1 Nov. 18, 2021

(30) Foreign Application Priority Data

May 12, 2020 (FR) ...................... 2004638

(51) Int. Cl.
*G06F 15/16* (2006.01)
*H04L 51/08* (2022.01)
*H04L 51/216* (2022.01)

(52) U.S. Cl.
CPC ............ *H04L 51/08* (2013.01); *H04L 51/216* (2022.05)

(58) Field of Classification Search
CPC ................................ H04L 51/08; H04L 51/16
USPC ......................................................... 709/206
See application file for complete search history.

(56) References Cited

U.S. PATENT DOCUMENTS

| | | | | |
|---|---|---|---|---|
| 6,963,929 B1 * | 11/2005 | Lee | ...................... | H04L 61/3015 709/229 |
| 7,392,289 B2 * | 6/2008 | Curry | .................... | G06Q 10/107 709/206 |
| 7,461,339 B2 * | 12/2008 | Liao | ..................... | H04L 63/1483 715/239 |
| 8,103,726 B2 * | 1/2012 | Stoddard | .............. | G06Q 10/107 709/206 |
| 8,516,246 B2 * | 8/2013 | Brener | .................. | H04L 63/062 726/2 |
| 8,572,496 B2 * | 10/2013 | Koopman | ............. | H04L 51/214 715/752 |
| 8,626,843 B2 * | 1/2014 | Wittig | .................. | G06Q 10/107 709/206 |
| 8,661,342 B2 * | 2/2014 | Lu | .......................... | G06Q 10/10 715/236 |
| 8,676,901 B1 * | 3/2014 | Nicolaou | ................ | H04L 51/08 709/204 |
| 8,924,492 B2 * | 12/2014 | Vasudevan | ........... | G06Q 10/107 709/206 |
| 9,052,792 B2 * | 6/2015 | Chavan | .............. | G06Q 30/0267 |

(Continued)

OTHER PUBLICATIONS

French Search Report for French Patent Application No. FR2004638, dated Jan. 18, 2021.

*Primary Examiner* — Alicia Baturay

(74) *Attorney, Agent, or Firm* — Knobbe, Martens, Olson & Bear, LLP

(57) ABSTRACT

A method for processing a message received via an electronic communication network by a user terminal is disclosed. The method comprises receiving the message, the message including data corresponding to an initial message content determined by a sender of the message and at least one data item corresponding to a function, the at least one data item being determined by the sender of the message; and determining a final content, the final content including the initial message content determined by the sender of the message and a specific content obtained by determining a result of the function applied to at least data from the user terminal.

12 Claims, 2 Drawing Sheets

(56) References Cited

U.S. PATENT DOCUMENTS

| | | | |
|---|---|---|---|
| 9,143,478 B2* | 9/2015 | Ramaswamy | G06F 16/955 |
| 9,680,782 B2* | 6/2017 | Barshow | H04L 51/216 |
| 9,794,364 B2* | 10/2017 | Shkolnikov | H04L 67/5651 |
| 9,935,907 B2* | 4/2018 | Beausoleil | H04L 51/42 |
| 10,171,409 B2* | 1/2019 | Mayala | G06Q 10/00 |
| 10,178,063 B2* | 1/2019 | Beausoleil | H04L 51/42 |
| 10,320,726 B2* | 6/2019 | Duale | H04L 51/18 |
| 10,560,412 B2* | 2/2020 | Smith | H04L 51/30 |
| 10,878,808 B1* | 12/2020 | Mathias | G10L 15/22 |
| 10,904,186 B1* | 1/2021 | Everton | G06Q 10/107 |
| 11,005,798 B2* | 5/2021 | Everton | H04L 51/063 |
| 11,087,739 B1* | 8/2021 | Rastrow | G06F 40/216 |
| 11,200,892 B1* | 12/2021 | Stoops | G06F 3/167 |
| 11,302,329 B1* | 4/2022 | Sun | G10L 25/51 |
| 11,355,112 B1* | 6/2022 | Pahwa | G06N 3/08 |
| 11,360,736 B1* | 6/2022 | Borja Jaramillo | G06F 40/10 |
| 2002/0052773 A1* | 5/2002 | Kraemer | G06Q 10/063112 705/7.14 |
| 2004/0128534 A1* | 7/2004 | Walker | H04L 67/535 726/13 |
| 2004/0205133 A1* | 10/2004 | Adler | H04L 51/08 709/206 |
| 2006/0293904 A1* | 12/2006 | Ramanathan | G06Q 10/00 709/206 |
| 2007/0038717 A1* | 2/2007 | Burkholder | G06F 16/958 707/E17.116 |
| 2007/0226679 A1* | 9/2007 | Jayamohan | G06Q 10/06 717/101 |
| 2008/0077675 A1* | 3/2008 | Graef | G06Q 10/107 709/206 |
| 2008/0126170 A1* | 5/2008 | Leek | G06Q 10/10 707/999.005 |
| 2009/0214034 A1* | 8/2009 | Mehrotra | G06Q 10/107 380/255 |
| 2010/0250477 A1* | 9/2010 | Yadav | G06N 20/00 706/14 |
| 2015/0339285 A1* | 11/2015 | Safaei | G06Q 10/107 715/256 |
| 2016/0087925 A1* | 3/2016 | Kalavagattu | H04L 51/066 709/206 |
| 2016/0373393 A1* | 12/2016 | Seniak | H04L 67/306 |
| 2016/0373403 A1* | 12/2016 | Seniak | G06Q 10/107 |
| 2018/0048600 A1 | 2/2018 | Duale et al. | |

* cited by examiner

SMART MESSAGE RENDERER

CROSS-REFERENCE TO RELATED APPLICATIONS

This application claims foreign priority to FR 2004638, filed May 12, 2020, the contents of each are incorporated by reference herein in its entirety.

BACKGROUND

Field

The invention relates to the field of written and voice messages transmitted electronically via telecommunications networks and decoded by means of user terminals. Example: emails decoded using an email client. It has applications in particular in the configuration of user terminals and more specifically message decoders (for example, messaging clients in the case of electronic messaging services) in order to adapt the messages to their recipient.

Description of the Related Technology

Indeed, in the case of multiple recipients, it is often necessary to adapt a message to each of the recipients, for example, the use of "Ms." or "Mr.", or in many languages "dear friend" in the masculine form versus "dear friend" in the feminine form or "you" in the informal form versus "you" in the formal form. These adaptations require writing as many different messages as there are recipients.

Thus, when a large number of written and voice messages are sent to multiple recipients, tailoring each message sent to the various recipients is a time-consuming task for the sender. In addition, it is difficult for the sender to predict the context of the reception by the recipients of the messages.

Known solutions for sending messages to multiple recipients exist. These consist of segmenting the messages according to the desired forms, on the basis of the targets and contexts.

This requires multiple manipulations by the sender, either manually or semi-automatically.

SUMMARY OF CERTAIN INVENTIVE ASPECTS

The invention improves the situation.

A first aspect of the invention relates to a processing, by a user terminal, of a message received via an electronic communication network at the user terminal, the method comprising: a reception of the message, said message comprising: data corresponding to an initial message content determined by the sender of the message; and at least one data item corresponding to a function, the at least one data item being determined by the sender of the message; a determination of a final content, said final content comprising: the initial message content determined by the sender of the message; and a specific content obtained by determining a result of the function applied to at least data from the user terminal.

The content of the received messages is thus adapted on the recipient's user terminal, in order to obtain the final content of the message. Indeed, the message on the recipient's user terminal contains the initial content of the message as well as a portion which is determined by the function by applying it to data from the user terminal. The sender's determination of the content of the message to be sent is simplified. Indeed, certain parts of the message are replaced by a data item corresponding to a function, for example an HTML tag or even a simple string of characters linked to a function. By introducing such data, the sender defines generic content, for example generic content representing a greeting. This generic content is not specific to a recipient. When the message is received by a recipient of the message, the message is processed by the user terminal to decode it. During this processing, the data item corresponding to the function is replaced by content specific to the recipient (called specific content), for example a generic greeting is replaced by "Good evening" or "Good morning". This content specific to the recipient is obtained by the recipient's terminal by determining a result of the function applied to at least data from the user terminal, for example as a function of data representative of the time of reception of the message by the user terminal. Thus, if the message is sent to two recipients with different time zones, the sender does not have to distinguish between messages for each of the recipients by indicating "Good morning" for one and "Good evening" for the other: the user terminal of each of the recipients will adapt the received message to the data from the user terminal. The sender can thus determine the content of a single message intended for several different recipients, the message comprising the initial content as well as the specific content. The message is then adapted by the user terminal of each recipient according to data from their user terminal. The message read or heard by a recipient is then adapted as if the message had been created for that recipient alone.

Decoding is understood to mean the determination by the user terminal of the content (for example the final content) of a message, by means of data and in particular the data item corresponding to the function. Once the decoding has been carried out, the user terminal can render this content, for example on a screen of the user terminal or even via a device intended to produce sounds (loudspeaker, earpiece, etc.).

User terminal is understood to mean a device enabling a user to receive data via an electronic communication network. In other words, the user terminal is an access point making it possible to connect to a wired or radio communication network and making it possible to receive and decode the messages received via this network. The user terminal is the terminal of a recipient of the message.

A data item corresponding to a function is understood to mean a data item which defines a function that takes as input at least one data item from the user terminal. The function can define the data from the user terminal considered as inputs to the function. The determination or decoding of the data item corresponding to the function is understood to be the calculation result from the function applied to the data from the user terminal that are considered as inputs.

To obtain the content resulting from decoding the data item corresponding to the function, it may be necessary to take into account other data, meaning that the function may be applied to other data in addition to the data from the user terminal, for example the data corresponding to the initial content of the message determined by the sender of the message, or taking into account data from the user terminal.

Message is understood to mean a voice message or a visual message (written words, drawing).

Initial content is understood to mean the message content determined by the sender. Said at least one data item corresponding to a function supplements the message content determined by the user. The specific content of the final content is determined from this at least one data item corresponding to a function.

Final content is understood to mean the content of a decoded message that can be rendered by the user terminal for the recipient. The final content of a same message decoded by two different user terminals may differ.

Data from the user terminal is understood to mean data present on the user terminal independently of reception of the message. For example, the data from the user terminal may relate to the recipient using the user terminal or to the user terminal.

According to one embodiment, provision is made for the receiving of the message by another user terminal, wherein a content obtained by determining a result of the function applied to data from the other user terminal differs from the specific content.

The result of the decoding of the message by the user terminal thus differs from the result of the decoding of the message by the other user terminal, because the content obtained by determining the result of the function applied to the data from the user terminal differs from the content obtained by determining the result of the function applied to the data from the other user terminal.

According to one embodiment, the message is an email (or electronic message) and the at least one data item corresponding to a function determined by the sender is a tag.

Thus, the invention applies in the case of electronic messages, where the data corresponding to functions are tags, for example, "HyperText Markup Language" tags (HTML), or Markdown tags. These tags can be determined by the sender without requiring special computer tools. This then simplifies the implementation of the invention.

According to one embodiment, the specific content is further obtained by determining the result of the function applied to data corresponding to the initial message content determined by the sender of the message.

The content obtained by decoding the data item corresponding to the function is obtained by determining the result of the function applied not only to the data from the user terminal, but also to the data corresponding to the initial message content determined by the sender of the message. For example, when the data item corresponding to the function refers to or points to a part of or all of the initial message content determined by the sender of the message, it is possible to specifically decode the data corresponding to this part of or to all of the initial content. Example: decoding the data corresponding to the initial message content determined by the sender of the message in order to obtain a part of or all of the initial message content in a language adapted to each recipient.

This makes it possible to adapt the initial message content determined by the sender of the message, to data from the user terminal, in other words to data specific to the user, and in particular to parameters determined by the user.

The initial message content determined by the sender of the message may correspond, at least in part, to the content obtained by determining a result of the function applied to the data from the user terminal.

According to one embodiment, the data from the terminal are parameters specific to a user and/or messages previously received by the user terminal and/or a local time of reception of the message by the user terminal and/or a state of the user terminal.

User is understood to mean the user of the user terminal, who may be the recipient of the message sent by the sender.

For example, the data from the terminal may be:
data from an address book (namely, parameters specific to a user); this makes it possible to adapt the message so that the final content thereof takes into account information from the address book (for example, if only work telephone numbers are entered then the salutations and closings can be adapted to business email exchanges, while conversely if home telephone numbers are entered then the salutations and closings can be adapted to personal email exchanges);

data on user availability (namely, parameters specific to a user and/or a state of the user terminal);

data from a message history (namely, parameters specific to a user); this makes it possible, for example, to determine how the recipient addressed the sender in previous messages and thus deduce the salutations or closings;

data from a clock; this makes it possible to adapt the message so that the final content thereof takes into account the moment of receipt (for example, "Good evening" or "Good morning");

data from a calendar; this makes it possible to adapt the message so that the final content thereof takes into account the day of receipt (for example, "Have a good weekend" or "Happy holidays");

data from a user profile (namely, parameters specific to a user); this makes it possible to adapt the message so that the final content thereof takes into account the user's profile (for example, including the recipient's name in the final content); and configuration data of the user terminal; this makes it possible to adapt the message so that the final content of the message takes into account the configuration of the user terminal (for example, so that the final content is in the configured language);

location data; this makes it possible in particular to adapt the message so that the final content of the message takes into account the moment of receipt relative to the time zone in which the user terminal is located (for example, "Good evening" or "Good morning");

data relating to the state of the user terminal, for example when the terminal is in standby mode or in active mode.

According to one embodiment, provision is made for the determination of a message to be sent, comprising: the determination of a message content by a user of the user terminal; the determination of a content replacing the specific content.

Thus, when the message is replied to or when it is forwarded to a new recipient, in particular in the context of an electronic message, it is not possible for the new recipient or former sender to deduce or determine the content obtained by determining the result of the function applied to the data from the user terminal. The data from the user terminal thus remain confidential.

According to one embodiment, provision is made for the user terminal to send the message to be sent, said message to be sent comprising: data corresponding to the message content determined by the user of the user terminal; data corresponding to the replacement content; the data corresponding to the initial message content determined by the sender of the message.

According to one embodiment, provision is made for an evaluation of the specific content obtained.

It is thus possible to provide an evaluation step implemented by the user terminal, in which the user of the user terminal (namely a recipient of the message) evaluates the specific content obtained by determining the result of the function. This makes it possible to adapt and/or improve the decoding. Indeed, although it is carried out on the basis of data from the user terminal, the specific content obtained may not correspond to what the sender would have individually sent to the recipient or to what the recipient wishes to receive. Evaluation is understood here to mean all methods enabling the recipient to score or to accept (or reject) the specific content obtained by determining the result of the function. It may be advantageous to offer the recipient a choice among alternatives in the case where the user would not accept the specific content to be evaluated, or to ask the recipient to propose an alternative which will be taken into account in future decodings of data; in other words the content obtained by determining the result of the function applied to at least data from the user terminal is obtained by determining the result the function applied to: data from the user terminal; and to data relating to the evaluation made by the recipient and/or to the alternative selected or proposed by the recipient.

According to another aspect, a computer program is proposed comprising instructions for implementing all or part of a method as defined herein when these instructions are executed by a processor. According to another aspect of the invention, a non-transitory, computer-readable storage medium on which such a program is stored is proposed.

According to another aspect, a user terminal configured to process a message received via an electronic communication network is proposed, the user terminal comprising: a network interface configured to receive and send messages via the electronic communication network; a processor; and a memory storing instructions, such that when these instructions are executed by the processor, they configure the user terminal to: receive, via the network interface, the message comprising: data corresponding to an initial message content determined by the sender of the message; and at least one data item corresponding to a function, the at least one data item being determined by the sender of the message; determine a final content, said final content comprising: the initial message content determined by the sender of the message; and a content obtained by determining a result of the function applied to at least data from the user terminal.

BRIEF DESCRIPTION OF THE DRAWINGS

Other features, details and advantages of the invention will be apparent from reading the following detailed description and from analyzing the accompanying drawings, in which.

DETAILED DESCRIPTION OF CERTAIN ILLUSTRATIVE EMBODIMENTS

Figure 1:
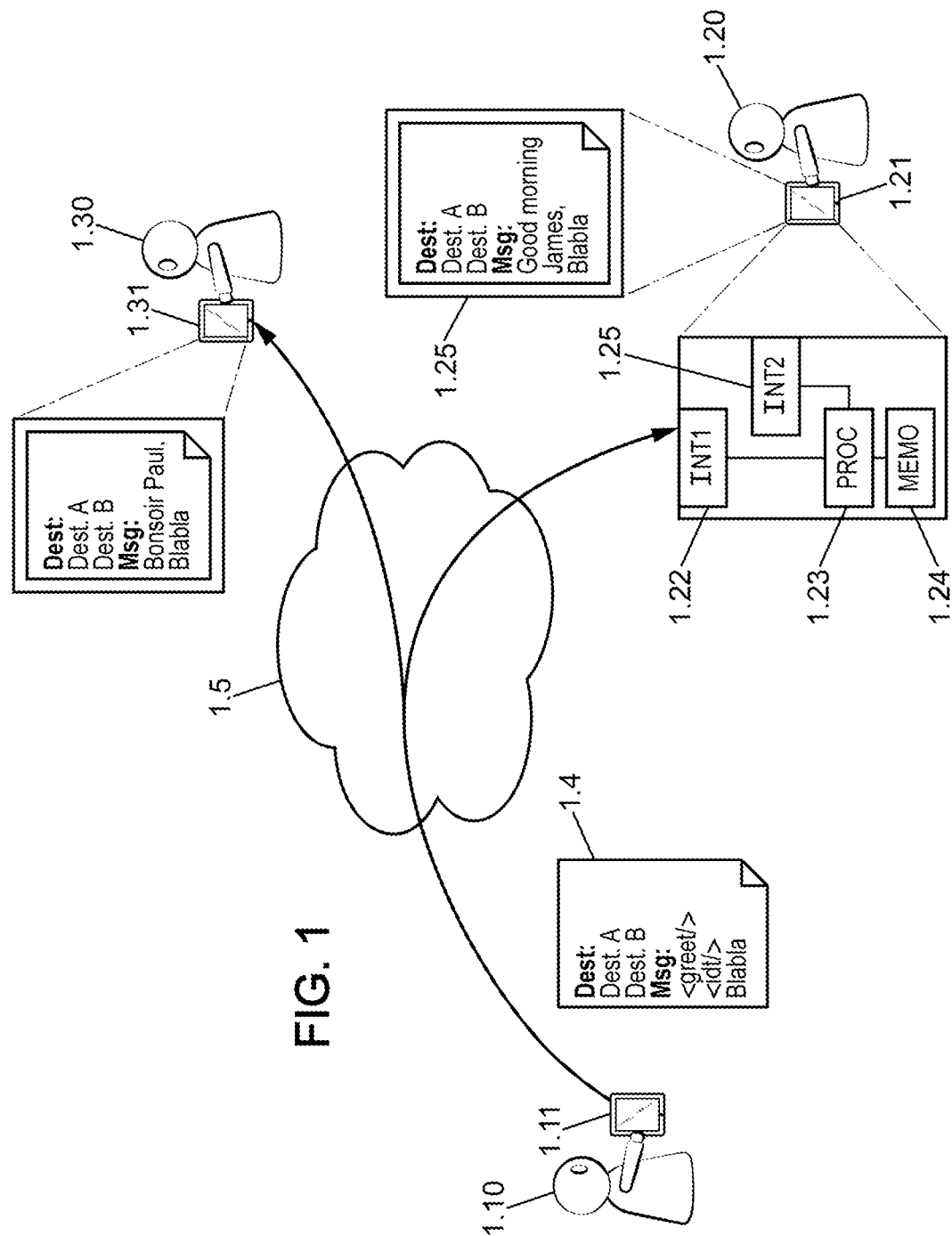
FIG. 1 illustrates the reception and rendering of a message according to one embodiment of the invention.

In the example of FIG. 1, a sender 1.10 sends a message 1.4 via an electronic communication network 1.5 (for example, the Internet or an intranet) to several recipients 1.20 (recipient A) and 1.30 (recipient B). The message 1.4 is sent by means of a user terminal 1.11 and received by means of user terminals 1.21 and 1.31. These user terminals 1.11, 1.21 and 1.31 may be, for example, computers, smartphones, or even tablet computers. In this example, only two recipients A 1.20 and B 1.30 are shown; however, the invention can be applied with no particular limits. The message sent 1.4 is a message in an electronic messaging service also called electronic mail, e-mail, or email. The invention can be applied with other types of messages, in particular voice messages.

The message comprises data corresponding to an initial message content determined by the sender of the message, namely the character string "Blabla". The message also comprises data corresponding to functions, these data also being determined by the sender, which here are <greet/> and <idt/>. In the case described in FIG. 1, the data corresponding to functions are HTML tags, and the initial content determined by the sender is text.

In other embodiments not shown, the data corresponding to the functions may also be text, in other words character strings determined by the sender that are representative of the functions (or at least linked to these functions), for example, "Hello" instead of <greet/>, "John Doe" instead of <idt/>. In the case where the message is a voice message, the data corresponds to a sound recording and the data corresponding to functions may be, for example, data representing a key of the computer keyboard or of the smartphone.

User terminal 1.21 is more fully detailed and comprises a module for interfacing with the electronic communication network (INT1) 1.22, a processor (PROC) 1.23, a memory (MEMO) 1.24, and a user interface module (INT2) 1.25.

The memory 1.24 comprises non-volatile memory in which is stored the computer program, and volatile memory in which are stored the parameters for implementation of the invention, for example the received message (namely, the data corresponding to the initial content and the data item corresponding to a function), the data from the user terminal, for example data from an address book (for example, the data corresponding to a personal or work address), user availability data (for example, data relating to the calendar), data from a message history (for example, data relating to the receipt of a message, replies to this message, or even forwarding of this message), data from a clock, data from a calendar, data from a user profile (for example, data relating to the language of the user), data relating to the configuration of the user terminal (for example, data relating to a mode of the terminal or to a type of connectivity), data relating to the state of the user terminal (for example, data relating to the mode of the user terminal, standby mode, active mode), location data (for example, GPS data), or evaluation data (for example, correspondences between the data corresponding to a function and scores, rejections, chosen alternatives, or words designated by the recipient).

The module for interfacing with the electronic communication network (INT1) 1.22 allows the user terminal 1.21 to receive the message 1.4 via the electronic communication network 1.5. It may be an internet modem and/or a network card for a computer or a wireless communication module which allows receiving and decoding a radio signal coming from an antenna of the electronic communication network 1.5.

The user interface module 1.25 allows in particular the rendering of the message 1.4 for the user 1.20 of the user terminal 1.21. The user interface module 1.25 also allows the user 1.20 to determine a message content to be sent and to evaluate the specific content, for example by giving a score or by accepting the specific content or by choosing alternatives to the specific content or by directly designating an alternative to the specific content. The user interface module 1.25 also allows the user 1.20 to determine certain data stored on the user terminal 1.21, for example the data from an address book, the data from a user profile, or the configuration data of the user terminal. The user interface module 1.25 may comprise a screen and a keyboard for a computer, or a touchscreen for a smartphone. The user interface module 1.25 may also comprise a microphone and a speaker in the event that the message 1.4 is a voice message.

The processor 1.23 is configured in particular to control the module for interfacing with the electronic communication network (INT1) 1.22 in order to be able to receive the message 1.4 via the network 1.5 and possibly also to send a message via the network 1.5. The processor 1.23 is also configured to determine the final content of the message, in other words the content of the message as it will be rendered for the user. The processor 1.23 determines this final content in the customary manner with regard to the initial message content determined by the sender of the message. The processor 1.23 determines the specific content by determining the result of the function applied to at least data from the user terminal, for example the data stored in the memory 1.24.

Figure 2:
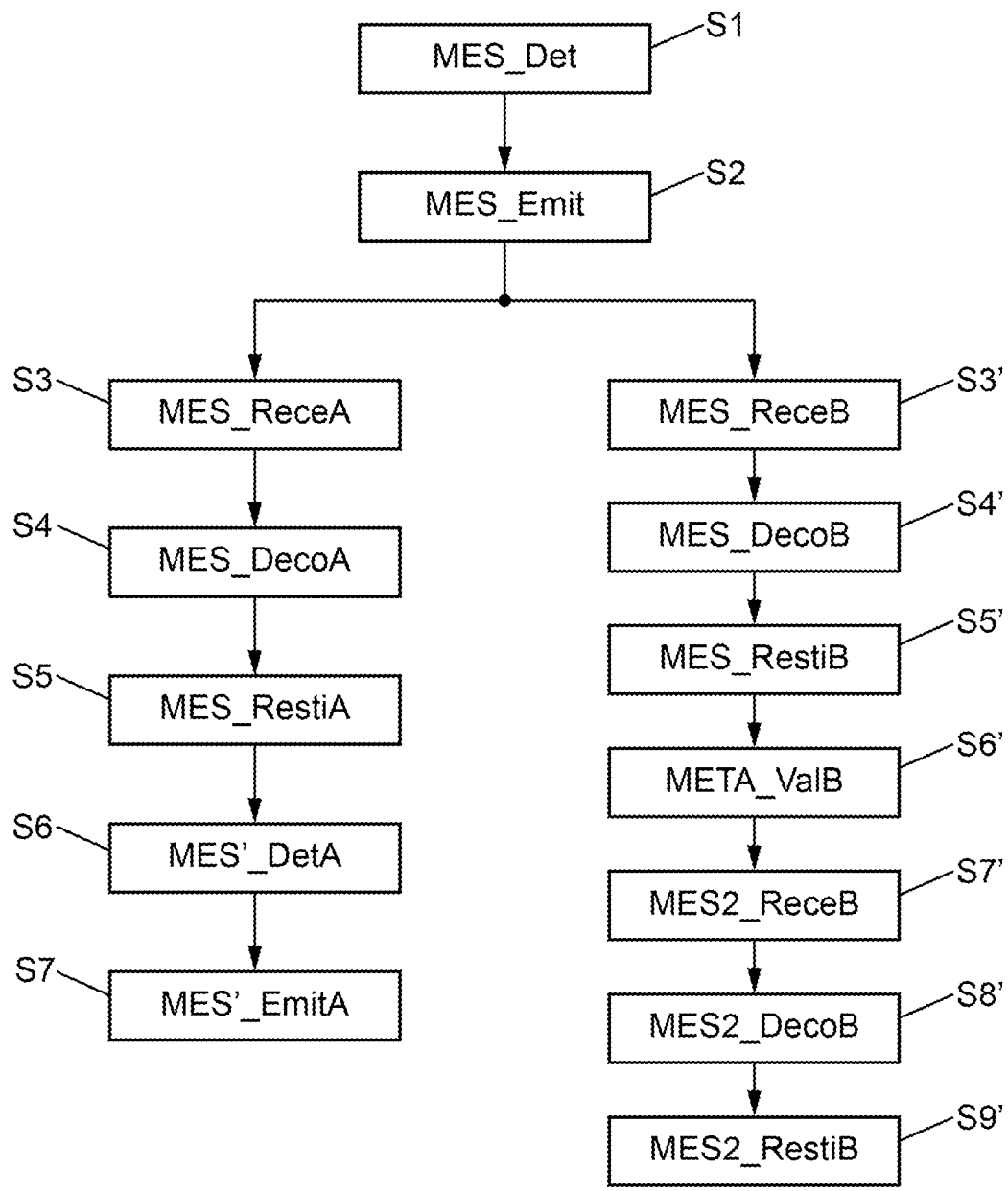
FIG. 2 illustrates a flowchart representing the method according to the invention.

FIG. 2 shows a flowchart of a method according to one embodiment of the invention.

In step S1, the sender 1.10 prepares a massage for recipients A 1.20 and B 1.31. To do so, the sender 1.10 determines in particular the initial content of the message. For example, the sender determines the text of the email 1.4 (here, "blabla") or the audio recording of the voice message 1.4. The sender 1.10 also determines at least one data item corresponding to a function. In the example of FIG. 1, meaning in the case where the message is an electronic message, the sender has determined data corresponding to two functions, which are the HTML tags <greet/> and <idt/>. These can be defined directly in the text of the 1.4 message, meaning the sender can write the strings "<greet/>" and "<idt/>" in the body of the text. It is also possible to use software configured to propose tags to the sender in order to simplify the determination of the data corresponding to the functions. Other data corresponding to functions will be described below. When the data corresponding to the functions are character strings representative of functions, then the sender determines the character string, for example "Hello" which corresponds to the same function as the <greet/> tag and "John Doe" which corresponds to the same function as the <idt/> tag.

When the message 1.4 is a voice message, the sender may, for example, determine the data item corresponding to a function by means of a key of a keyboard for a telephone, smartphone, or computer. For example, the keys of the numeric keypad can each correspond to a data item corresponding to a different function, for example the "1" key can correspond to a tag such as <idt/> (whose decoding by the recipient's user terminal 1.20 or 1.30 returns the name of the addressee). During recording of the voice message, the sender can then press the "1" key which will introduce a characteristic sound or digital signal <idt/> into the voice message.

In step S2, the sender 1.10 sends a message 1.4 via the electronic communication network 1.5 (in the example of FIG. 1 this is the Internet) to several recipients 1.2 and 1.3.

In steps S3 and S3', the user terminals 1.21 and 1.31 receive the message 1.4, via their respective module for interfacing with the electronic communication network (only INT1 1.22 is shown in FIG. 1). User terminals 1.21 and 1.31 may send acknowledgment messages to user terminal 1.11 via their module for interfacing with the electronic communication network. These messages may contain the final contents as determined by each of the user terminals 1.21 and 1.31 (determination described in the following steps), for example following approval by each of the recipients 1.30 and 1.20 to transmit the final contents. In the absence of such approval or more generally of an authorization, the acknowledgment messages will not include the final content as determined by each of the user terminals 1.21 and 1.31.

In steps S4 and S4', the processors of user terminals 1.21 and 1.31 (only PROC 1.23 is shown in FIG. 1) determine the final content of the message. Thus, the processors decode the data corresponding to the initial message content determined by the sender 1.10 in step S1, namely they decode data encoding the text "Blabla" in the example of FIG. 1. Furthermore, the processors decode the data corresponding to the functions determined by the sender 1.10 in step S1, namely the <greet/> and <idt/> tags in the example, or "Hello" and "John Doe" in one alternative. This decoding of the data corresponding to functions is done on the basis of the data from each user terminal. This decoding of the data corresponding to the functions, by the processor 1.23 of user terminal 1.21, is done on the basis of data stored in the memory 1.24 of this same user terminal 1.21. The decoding performed by the processors of user terminals 1.21 and 1.31 may be performed at different times after receipt of the message. For example, it may be implemented at the time the message is received by each user terminal 1.21 and 1.31, but also at the time the message is opened and rendered for each recipient.

More precisely, the processor 1.21 calculates the results (also called specific content) from the functions corresponding to the data of the message 1.4, applied to the data from the user terminal 1.21. Thus, the tag "<idt/>", or the character string "John Doe", determines a function which, using data from the user profile (stored in the memory 1.24) of the recipient 1.20, returns the name of the recipient 1.20. The "<greet/>" tag, or the "Hello" character string, determines a function which, using data from the clock of the user terminal 1.21 and/or location data (or even time zone data), returns a salutation that depends on the time when the message 1.4 is received, for example "Good morning" or "Good evening". Other data corresponding to functions can be determined, for example:

"<greet/>", or the character string "Hello", can also determine a function which, using data from the address book of the recipient 1.20 that are stored in memory 1.24, returns a salutation which depends on the level of familiarity between the sender 1.10 and the recipient 1.20. For example, if only work telephone numbers of the sender 1.10 are entered, then the result from the decoding of "<greet/>" by the processor 1.23 could be "Mr." or "Ms.". Conversely, if home telephone numbers of the sender 1.10 are entered, then the result from the decoding of "<greet/>" by the processor 1.23 can be "Good morning", "Good evening", or even "Hi". The result of the function associated with "<greet/>" may also depend on data from the message history stored in memory 1.24, also making it possible to determine a level of familiarity between the sender 1.10 and receiver 1.20 based on previous messages.

"<bye/>", or even the character string "Goodbye", determines a function which, using data from the terminal 1.21 that are stored in memory 1.24, returns a closing phrase, for example "Have a nice day", "Have a nice evening", "Have a nice weekend", "Sincerely". The data from the user terminal 1.21 that are concerned by this function are the same as in the case of "<greet/>". The result of the function associated with "<bye/>" may also depend on calendar data stored in memory 1.24, for example "Have a nice weekend".

"<proximity/>", or even the character string "You", determines a function which, using data from the terminal 1.21 that are stored in memory 1.24, returns the familiar or the formal personal pronoun for languages which distinguish these, for example "tu" or "vous" in French. The data from the user terminal 1.21 concerned by this function may be the data from the address book of the recipient 1.20, as in the case of "<greet/>".

"<availability/>" determines a function which, using user availability data stored in memory 1.24, returns an intro apologizing for any inconvenience and providing an excerpt from the message or possibly asking them to read it later.

"<translate>" and "</translate>" determines a function which, using configuration data of the user terminal and/or localization data and text contained between the two tags, returns a translation of this text in the configured language or in the language corresponding to the location.

"<safecontent>" and "</safecontent>" determines a function which, using configuration data of the user terminal and text contained between the two tags, returns this text while removing or replacing inappropriate language elements.

"<repetition/>" determines a function which, using data relating to the history of messages stored in memory 1.24, returns a salutation which depends on the messages previously exchanged between the sender and the recipient, for example "Good morning again" or "Good evening again".

The result of decoding the <greet/> and <idt/> tags, or alternatively the "Hello" and "John Doe", of message 1.4 in the example of FIG. 1, is "Good morning James" when the decoding is performed by user terminal 1.21 on the basis of data from the terminal that are stored in memory 1.24. These results are thus adapted to the recipient A 1.20 of the message 1.4, without the sender needing to know these various results. Furthermore, the result of decoding the <greet/> and <idt/> tags of the message 1.4, or alternatively the "Hello" and "John Doe", by the processor of the user terminal 1.31 on the basis of data from the terminal that are stored in the memory of that terminal (not shown), is "Bonsoir Paul". These results, adapted to recipient B 1.30 of the message 1.4, differ from those calculated by the processor of user terminal 1.21.

In steps S5 and S5', the processors of user terminals 1.21 and 1.31 (only PROC 1.23 is shown in FIG. 1) respectively control their user interface modules (only INT2 1.25 is shown in FIG. 1) so as to be able to display the final content determined in steps S4 and S4'.

In step S6, a message to be sent is determined. This message comprises in particular a message content determined by recipient 1.20, the initial message content determined by the sender 1.10 for the message 1.4, and a replacement content. This replacement content may be determined by recipient 1.20 or by the processor 1.23, for example by replacing the specific content with a character string corresponding to the tags, for example "greet" and "idt" in the example of FIG. 1. The content of the message to be sent can also show the specific content of the message decoded by the processor 1.23 according to a configuration decided by the recipient 1.20 or following a confirmation performed by the recipient, for example at the time the message is sent or when configuring an application or a computer program used for sending/receiving messages. The message to be sent may be an acknowledgment of receipt, the specific content may also be replaced or not replaced depending on a parameter setting or on a confirmation by the recipient.

In step S7, the processor 1.23 controls INT1 1.22 in order to send the message determined in step S6 and which in particular comprises the replacement content. The recipient of this sent message will thus not have the specific content, which is replaced by the replacement content. He therefore will not be able to deduce therefrom the data from the user terminal that are stored in memory 1.24.

In step S6', the processor of user terminal 1.31 controls the user interface of user terminal 1.31 so that recipient 1.30 can evaluate the content obtained by decoding the tag or strings. For example, once the final content is displayed on the user interface of user terminal 1.31, this interface asks the recipient 1.30 to:

score the specific content, for example, between 1 and 5, or accept or reject the specific content, for example, "do you accept the content?", "Yes", "No".

In the event that recipient 1.30 answers "no" or gives a low score, the user interface may ask recipient 1.30 to choose among alternatives, for example if recipient 1.30 does not accept "Good evening", the interface proposes "Good morning" or "Hope you are having a good weekend". Alternatively, when the recipient 1.30 answers "no", the user interface may also display an input field so that the recipient 1.30 can offer an alternative; the recipient 1.30 can then freely enter a word, for example "Hello".

Steps S7', S8', and S9' correspond to the reception, decoding, and rendering of a second message of which the user 1.30 of user terminal 1.31 is the recipient. These steps correspond to steps S3', S4', and S5', but with another message (here the second message) sent by the same or another sender.

In step S7', user terminal 1.31 receives a second message (not shown), via its module for interfacing with the electronic communication network. This second message also comprises a data item corresponding to a function.

In step S8', the processor of user terminal 1.31 decodes the second message and in particular the processor decodes the data item corresponding to the function of the second message based on data from user terminal 1.31, but also based on the result of evaluating the specific content previously decoded. For example, if the recipient 1.30 of the first message does not approve "Good evening" and enters "Hello", then if the second message includes the data item "<greet/>" corresponding to a function, the result of decoding this data item corresponding to the function (namely, the determination of the result of the function applied to the data from the user terminal which include the results of the evaluation) by user terminal 1.31 is then "Hello" and not "Good evening".

In step S9', the processor of user terminal 1.31 controls the user interface module in order to display the second final content determined in step S8'.

Steps S6 and S7 concern the sending of a message in response to the message 1.4, or the forwarding of the message 1.4. These steps may be implemented together with the steps relating to validation of the specific content (S6' to S9'), meaning that a validation step similar to that of S6' can be implemented before step S6 or after step S7. The reception, decoding, and rendering of a second message by user terminal 1.21 will then be done in a similar manner in steps S7' to S9'.

The invention claimed is:

1. A method of processing a message received via an electronic communication network by a user terminal, the method comprising:
   receiving the message, the message comprising:
      data corresponding to an initial message content determined by a sender of the message; and
      at least one data item corresponding to a function, the at least one data item being determined by the sender of the message, the function having at least two different results; and
   determining the message final content, the final content comprising:
      the initial message content determined by the sender of the message; and
      a specific content obtained by determining a result of the function applied to at least data from the user terminal.

2. The method of claim 1, further comprising the receiving of the message by another user terminal, wherein a content obtained by determining a result of the function applied to data from the other user terminal differs from the specific content.

3. The method of claim 1, wherein the message is an email and the at least one data item corresponding to the function is a tag.

4. The method of claim 1, wherein the specific content is further obtained by determining the result of the function applied to data corresponding to the initial message content determined by the sender of the message.

5. The method of claim 1, wherein the data from the terminal are parameters specific to a user and/or messages previously received by the user terminal and/or a local time of reception of the message by the user terminal and/or a state of the terminal.

6. The method of claim 1, wherein the data from the terminal are at least one of the following:
   data from an address book;
   data on user availability;
   data from a message history;
   data from a clock;
   data from a calendar;
   data from a user profile;
   configuration data of the user terminal;
   location data; and
   data relating to the state of the user terminal.

7. The method of claim 1, further comprising determining a message to be sent, comprising:
   determining a message content by a user of the user terminal; and
   determining a content replacing the specific content.

8. The method of claim 7, further comprises the sending by the user terminal of the message to be sent, the message to be sent comprising:
   data corresponding to the message content determined by the user of the user terminal;
   data corresponding to the replacement content; and
   the data corresponding to the initial message content determined by the sender of the message.

9. The method of claim 1, further comprising an evaluation of the specific content.

10. The method of claim 9, further comprising:
    receiving a second message comprising the at least one data item corresponding to the function, and
    determining a second final content comprising a second specific content obtained by determining a result of the function applied to at least the data from the user terminal and a result of the evaluation of the specific content.

11. A non-transitory computer-readable storage medium comprising a computer program stored thereon and comprising instructions for implementing the method of claim 1, when the instructions are executed by a processor.

12. A user terminal configured to process a message received via an electronic communication network, the user terminal comprising:
    a network interface configured to receive and send messages via the electronic communication network;
    a processor; and
    a memory storing instructions executed by the processor, wherein the executed instructions configure the user terminal to:
    receive, via the network interface, the message comprising:
       data corresponding to an initial message content determined by a sender of the message; and
       at least one data item corresponding to a function, the at least one data item being determined by the sender of the message, the function having at least two different results;
    determine the message final content, the final content comprising:
       the initial message content determined by the sender of the message; and
       a specific content obtained by determining a result of the function applied to at least data from the user terminal.

* * * * *